United States Patent [19]

Kato et al.

[11] 4,202,805

[45] May 13, 1980

[54] COATING RESIN COMPOSITION

[75] Inventors: Nobukatsu Kato, Nagoya; Yoshio Morimoto, Tokai; Hiroshi Ozawa, Yokohama, all of Japan

[73] Assignee: Mitsui Toatsu Chemicals Incorporated, Tokyo, Japan

[21] Appl. No.: 959,766

[22] Filed: Nov. 13, 1978

[30] Foreign Application Priority Data

Nov. 24, 1977 [JP] Japan ................. 52-139908

[51] Int. Cl.$^2$ ............... C09D 3/74; C09D 5/08
[52] U.S. Cl. ............... 260/22 CB; 260/22 R; 260/22 M; 525/326; 525/384; 525/386
[58] Field of Search ......... 526/54, 56; 260/879, 260/22 M, 22 R, 22 CB; 525/326

[56] References Cited

U.S. PATENT DOCUMENTS

| | | | |
|---|---|---|---|
| 3,429,952 | 2/1969 | Nordsiek et al. | 260/879 |
| 4,025,407 | 5/1977 | Chang et al. | 260/22 CB |
| 4,054,611 | 10/1977 | Mimaki et al. | 568/703 |
| 4,080,493 | 3/1978 | Yasui et al. | 260/879 |
| 4,082,817 | 4/1978 | Imaizumi et al. | 260/879 |
| 4,117,036 | 9/1978 | Honda et al. | 526/56 |
| 4,131,749 | 12/1978 | Kiedik et al. | 568/781 |

FOREIGN PATENT DOCUMENTS

| | | |
|---|---|---|
| 813981 | 5/1969 | Canada . |
| 1812988 | 8/1969 | Fed. Rep. of Germany . |
| 48-43378 | 12/1973 | Japan . |
| 905994 | 9/1962 | United Kingdom . |

*Primary Examiner*—Ronald W. Griffin

[57] ABSTRACT

Disclosed is a resin composition comprising the reaction product obtained by reacting an isopropenylphenol and/or its oligomers with a straight-chain unsaturated fatty acid, an unsaturated fat or oil, a polymer of diene hydrocarbon or its derivative having carboxyl or hydroxyl substituents at the ends of the polymer molecule, or a maleinized polymer of diene hydrocarbon and then reacting the resulting intermediate product with a polyhydric alcohol and/or a polybasic acid. When used as a coating and particularly as an undercoating for metals, this resin composition exhibits excellent resistance to corrosion and to water. It may either be directly used as an oil-soluble resin composition or be neutralized with a base prior to use as a water-soluble one.

8 Claims, No Drawings

COATING RESIN COMPOSITION

BACKGROUND OF THE INVENTION

1. Field of the Invention

This invention relates to coating resin compositions which can form a coating film having excellent resistance to corrosion and to water.

2. Description of the Prior Art

Conventionally, alkyd resins, maleinized oils (maleic oils), and maleinized polybutadiene resins are widely used as coating resins and particularly as undercoating resins. However, these resins have the disadvantage that their resistance to corrosion and to water is insufficient to protect metals from corrosion.

SUMMARY OF THE INVENTION

It is an object of the present invention to provide a coating resin composition having excellent resistance to corrosion and to water.

It is another object of the present invention to provide a coating resin composition which is particularly valuable for undercoating uses.

According to the present invention, there is provided a coating resin composition comprising the reaction product obtained by reacting at least one isopropenylphenol compound selected from the group consisting of the compounds of the formulas

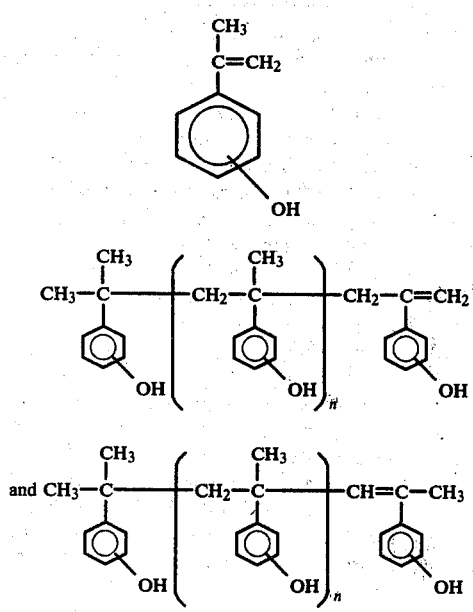

wherein n is a whole number of from 0 to 18, with at least one compound (hereinafter referred to as "unsaturated compound") selected from the group consisting of (i) straight-chain unsaturated fatty acids (hereinafter referred to as "unsaturated fatty acids"), (ii) unsaturated fats and oils composed mainly of glycerides of straight-chain unsaturated fatty acids (hereinafter referred to as "unsaturated fats and oils"), (iii) polymers of diene hydrocarbon (hereinafter referred to as "diene polymers"), (iv) polymers of diene hydrocarbon having carboxyl substituents at the ends of the polymer molecule (hereinafter referred to as "carboxylated diene polymers"), (v) polymers of diene hydrocarbon having hydroxyl substituents at the ends of the polymer molecule (hereinafter referred to as "hydroxylated diene polymers") and (vi) maleinized polymers of diene hydrocarbon (hereinafter referred to as "maleinized diene polymers"); and then reacting the resulting intermediate product with at least one compound (hereinafter referred to as "polyfunctional compound") selected from the group consisting of polyhydric alcohols and polybasic acids. The reaction of at least one isopropenylphenol compound with at least one unsaturated compound will hereinafter be referred to as the "first-step reaction" and the reaction of the resulting intermediate product with at least one polyfunctional compound as the "second-step reaction".

In the above formulas (I), (II) and (III), the hydroxyl groups may be present in any of the ortho, meta and para positions.

The compounds of formula (I) and of formulas (II) and (III) wherein n is equal to 0 or 1, namely isopropenylphenol monomers, dimers and trimers, can be obtained in the pure form. However, the compounds of formulas (II) and (III) wherein n is equal to 2 or more, namely isopropenylphenol tetramers and higher oligomers, are usually prepared in the form of mixtures. In the process of the invention, these monomers and oligomers may be used either alone or in combination.

The reactant which is added to the reaction system at the beginning of the second-step reaction is at least one polyfunctional compound, namely a polyhydric alcohol and/or a polybasic acid. The type of reactant added depends on the type of unsaturated compound used to obtain the intermediate product. The following various combinations are contemplated by the present invention.

(1) When the unsaturated compound is an unsaturated fatty acid, an unsaturated fat or oil, or a carboxylated diene polymer, the reactant can be (a) a polyhydric alcohol alone, (b) maleic anhydride alone, or (c) a mixture of a polyhydric alcohol and a polybasic acid.

(2) When the unsaturated compound is a maleinized diene polymer, the reactant can be (a) a polyhydric alcohol alone or (b) a mixture of a polyhydric alcohol and a polybasic acid.

(3) When the unsaturated compound is a diene polymer, the reactant can be (a) maleic anhydride alone.

(4) When the unsaturated compound is a hydroxylated diene polymer, the reactant can be (a) a polybasic acid alone or (b) a mixture of a polyhydric alcohol and a polybasic acid.

As described in the above paragraphs (1) and (3), maleic anhydride alone can be used as the reactant to be added at the beginning of the second-step reaction. In such a case, the product resulting from the second-step reaction may further be reacted with (a) a polyhydric alcohol or (b) a mixture of a polyhydric alcohol and a polybasic acid. It is to be understood that coating resin compositions comprising the reaction product thus obtained also fall within the scope of the invention.

DESCRIPTION OF THE PREFERRED EMBODIMENTS

The isopropenylphenol monomers and oligomers which are useful in the practice of the invention are typically prepared by any one of the following three methods.

(1) Diphenylolpropanes are cleaved in the presence of an acid or alkaline catalyst to form p-isopropenylphenol and its oligomers. The resulting p-isopropenylphenol can further be converted into its dimer, trimer, higher oligomers, or mixtures thereof.

(2) Isopropenylphenols are obtained as by-products in the process of preparing hydroquinone or resorcinol by oxidizing di-isopropylbenzenes and then decomposing the resulting products.

(3) Isopropenylphenols are prepared by dehydrogenation of propylphenols.

The isopropenylphenol monomers and oligomers which are prepared by these three methods are all usable in the practice of the invention.

In the above-described method (1), p,p'-diphenylolpropane (also known as bisphenol A) is commonly used as starting material. However, the p,o'-isomer can also be used in a similar manner. In both cases, the reaction product comprises p-isopropenylphenol and its oligomers. The phenol formed as a by-product of the cleavage may be removed by any suitable means. Alternatively, instead of removing the phenol by-product, the whole reaction product may be used in the process of the invention.

According to the above-described method (2) using a di-isopropylbenzene as starting material, isopropenylphenols are obtained as by-products. Although the main purpose of this method is to produce hydroquinone or resorcinol, the additional formation of m- or p-isopropenylphenol and m- or p-isopropylphenol is unavoidable. Instead of separating these by-products, the whole reaction product may be used in the process of the invention.

The method (3) based on the dehydrogenation of propylphenols permits o-, m- and p-isopropenylphenols to be prepared either alone or in combination. Generally, propenylphenols are produced by reacting phenol with propylene to form a mixture of isomers. In the process of the invention, the dehydrogenation product derived from such a mixture can be used with satisfactory results.

For purposes of illustration, a method of converting p-isopropenylphenol into its oligomers is described below.

p-Isopropenylphenol is heated at 125° C. for 1 hour. When cooled to 115°–120° C. and agitated, it gradually solidifies to form a yellow mass. This mass is dissolved in toluene and recrystallized in a usual manner to obtain a 70% yield of white crystalline product.

This product is the dimer having the formula

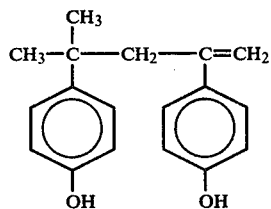

On the other hand, p-isopropenylphenol is dissolved in acetic acid (to a concentration of 50%). After a catalytic amount of 37% hydrochloric acid is added so as to maintain of pH of 1, the solution is agitated at 25° C. for 18 hours to form a white crystalline precipitate. The precipitate is recrystallized from a methanol-water mixture. The product thus obtained is the trimer having the formula

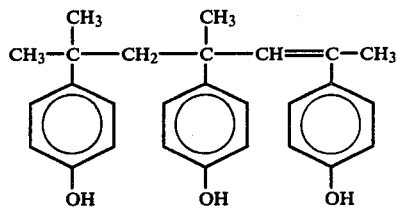

The unsaturated compounds which are useful in the practice of the invention preferably have an iodine value of 140 or greater and include, for example, (i) straight-chain fatty acids such as eleostearic acid, linolic acid, conjugated linolic acid, linolenic acid, and the like; (ii) unsaturated fats and oils composed mainly of glycerides of straight-chain unsaturated fatty acids, such as tung oil, perilla oil, oiticica oil, linseed oil, dehydrated castor oil, isomerized linseed oil, safflower oil, and the like; and (iii) polymers of diene hydrocarbons, such as polybutadiene, polyisoprene, polydicyclopentadiene, and the like.

In the practice of the invention, the reaction of an isopropenylphenol compound with an unsaturated compound is carried out by heating the reactants at a temperature of from 50° to 200° C. and preferably from 65° to 180° C. in the presence or absence of a solvent as described below. Although the reaction can proceed in the absence of a catalyst, it is preferable to accelerate the reaction by using a catalyst as described below. In ordinary cases, the reaction is desirably carried out in an atmosphere of nitrogen.

The solvents which can be used in the first step of the present process include inert organic solvents such as toluene, xylene, and the like; and polyhydric alcohols in the form of liquid at room temperature, such as ethylene glycol, propylene glycol; glycerol, and the like. When an inert organic solvent such as toluene, xylene, or the like is used, it may be removed by heating or vacuum distillation at the end of the first-step reaction. Alternatively, the intermediate product dissolved in the solvent may be directly subjected to the second-step reaction which will be described later. When a polyhydric alcohol is used, it can serve not only as a solvent for the first-step reaction but also as a reactant for the second-step reaction. Accordingly, if the unsaturated compound used in the first-step reaction is an unsaturated fatty acid, an unsaturated fat or oil, a carboxylated diene polymer, or a maleinized diene polymer, part of the second-step reaction will take place in the course of the first-step reaction.

The catalysts which are preferably used in the first step of the present process include strong acids such as hydrochloric acid, sulfuric acid, phosphoric acid, p-toluenesulfonic acid, and the like. When such a catalyst is used, the second-step reaction can generally be carried out without neutralizing the catalyst in advance thereof. However, if the catalyst has unduly strong acidity, it is preferable to neutralize it at the end of the first-step reaction.

The reaction of an isopropenylphenol compound with an unsaturated compounds is not fully understood as yet. However, on the basis of a series of studies performed by the present inventors, the following mechanisms are considered to be probable.

(i) When the isopropenylphenol compound is at least one member selected from isopropenylphenol trimers and higher oligomers, the greater part thereof seems to be eventually cleaved into the corresponding monomer or dimer, which then reacts with the unsaturated compound.

(ii) When the unsaturated compound is a compound having conjugated double bonds, such as eleostearic acid, conjugated linolic acid, tung oil, oiticica oil, or the like, the isopropenylphenol monomer or dimer attacks the conjugated double bonds to cause shifting of the double bonds and migration of a proton. The resulting linkage, which still contains conjugated double bonds, can be represented by the formula

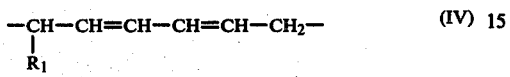   (IV)

wherein $R_1$ is a

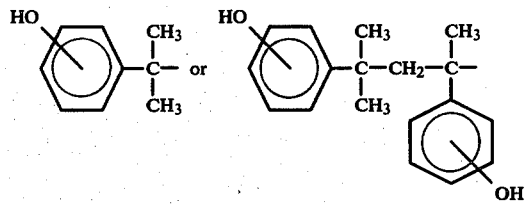

radical.

The linkage of formula (IV) further reacts with the isopropenylphenol monomer or dimer. The resulting linkage, which still contains conjugated double bonds, can be represented by the formula.

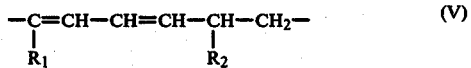   (V)

wherein $R_1$ and $R_2$ have the same meaning as defined for $R_1$ in formula (IV), and the radicals represented by $R_1$ and $R_2$ may be identical to or different from each other.

(iii) When the unsaturated compound is a compound having unconjugated double bonds, three types of reactions take place. One of them is a reaction similar to that described above for a compound having conjugated double bonds. The resulting linkage can be represented by the formula

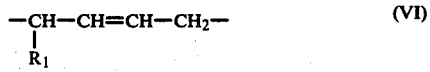   (VI)

wherein $R_1$ has the same meaning as defined for $R_1$ in formula (IV).

Another is the Friedel-Crafts reaction in which the double bonds of the unsaturated compound disappear and the nucleus (or nuclei) of the isopropenylphenol monomer or dimer undergoes alkylation. The resulting linkage can be represented by the formula

   (VII)

wherein $R_3$ is, for example, a

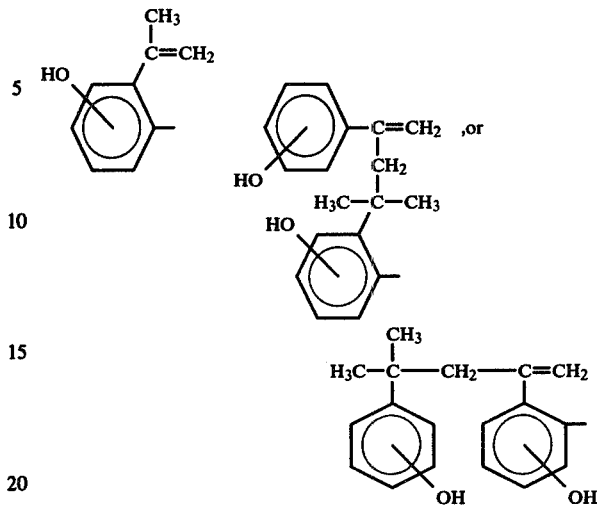

radical.

The third is the reaction in which the double bonds of the unsaturated compound attack the double bond of the isopropenylphenol monomer or dimer and the double bonds of the former disappear. The resulting product has a complicated structure.

As can be seen from the above description, the reaction of an isopropenylphenol compound with an unsaturated compound involves complicated mechanisms which are not completely elucidated as yet. At any rate, the greater part of the isopropenylphenol compound is first cleaved into the corresponding monomer or dimer as described in the above mechanism (i). Accordingly, the extent to which this reaction has proceeded can be estimated by tracing the change in the monomer and dimer contents of the reaction system. For example, the reaction system may be periodically analyzed for the monomer and dimer by gas chromatography. Then, the completion of the reaction can be confirmed by the disappearance of their peaks.

In this first step of the present process, the isopropenylphenol compound and the unsaturated compound are suitably used in such a proportion as to provide from 0.2 to 1.5 parts by weight of the former per part by weight of the latter.

In order to prepare the coating resin compositions of the present invention, the intermediate product resulting from the above-described reaction is further reacted with a polyfunctional compound (a polyhydric alcohol and/or a polybasic acid).

The polyhydric alcohols which are useful in the practice of the invention include, for example, ethylene glycol, propylene glycol, 1,3-butanediol, 1,4-butanediol, pentanediols, hexanediols, neopentyl glycol, trimethyl-pentanediols, hydrogenated bisphenol A, adducts of bisphenol A with ethylene oxide or propylene oxide, polyethylene glycol, glycerol, polytetramethylene glycol, trimethylolethane, trimethylol-propane, pentaerythritol, initial reaction products of diisocyanates with glycols (or the so-called polymer polyols), epoxy resins obtained by reaction of polyhydric phenols with epichlorohydrin (which resins can be regarded as potential polyols), initial reaction products of epoxy resins with glycols, and the like.

The polybasic acids which are useful in the practice of the invention include, for example, phthalic anhydride, isophthalic acid, terephthalic acid, maleic anhydride, fumaric acid, succinic acid, adipic acid, sebacic acid, azelaic acid, dodecenedioic acid, brassylic acid, eicosanedioic acid, tetrahydrophthalic anhydride, hexahydrophthalic anhydride, 3-methyltetrahydrophthalic anhydride, endomethylenetetrahydrophthalic anhydride, dodecenylsuccinic acid, trimellitic anhydride, pyromellitic anhydride, 1,2,3,4-butanetetracarboxylic acid, and the like.

The reaction taking place in the second step of the present process varies according to the type of unsaturated compound used in the first-step reaction and the type of reactant newly added to the reaction system.

The mechanisms involved in the second-step reaction are as follows.

(1) When the unsaturated compound is an unsaturated fatty acid, a carboxylated diene polymer, or a maleinized diene polymer and the additional reactant is a polyhydric alcohol, the esterification reaction of the carboxyl groups of the intermediate product with the polyhydric alcohol takes place.

(2) When the unsaturated compound is a hydroxylated diene polymer and the additional reactant is a polybasic acid, the esterification reaction of the alcoholic hydroxyl groups of the intermediate product with the polybasic acid takes place.

(3) When the unsaturated compound is an unsaturated fatty acid, a carboxylated diene polymer, or a maleinized diene polymer and the additional reactant is a mixture of a polyhydric alcohol and a polybasic acid, the esterification reaction of the carboxyl groups of the intermediate product and the polybasic acid with the polyhydric alcohol takes place.

(4) When the unsaturated compound is a hydroxylated diene polymer and the additional reactant is a mixture of a polyhydric alcohol and a polybasic acid, the esterification reaction of the alcoholic hydroxyl groups of the intermediate product and the polyhydric alcohol with the polybasic acid takes place.

(5) When the unsaturated compound is an unsaturated fat or oil and the additional reactant is a polyhydric alcohol, the ester interchange reaction of the glyceride linkages of the intermediate product with the polyhydric alcohol takes place.

(6) When the unsatruated compound is an unsaturated fat or oil and the additional reactant is a mixture of a polyhydric alcohol and a polybasic acid, the ester interchange reaction of the glyceride linkages of the intermediate product with the polyhydric alcohol as well as the esterification reaction of the glycerol resulting from this ester interchange reaction and the polyhydric alcohol with the polybasic acid takes place.

(7) When the unsaturated compound is an unsaturated fatty acid, a carboxylated diene polymer, and unsaturated fat or oil, or a diene polymer and the additional reactant is maleic anhydride, the maleinization reaction of the carbon-to-carbon double bonds of the intermediate product with the maleic anhydride takes place.

As described under the head of "Summary of the Invention", the maleinization reaction product obtained by the above mechanism (7) may further be reacted with (a) a polyhydric alcohol or (b) a mixture of a polyhydric alcohol and a polybasic acid. It has already been stated that coating resin compositions comprising the reaction product obtained by this third-step reaction also fall within the scope of the invention. The mechanisms involved in the third-step reaction are as follows.

(a) When a polyhydric alcohol is used, the esterification reaction of the carboxyl groups of the maleinization reaction product with the polyhydric alcohol takes place.

(b) When a mixture of a polyhydric alcohol and a polybasic acid is used, the esterification reaction of the carboxyl groups of the maleinization reaction product and the polybasic acid with the polyhydric alcohol takes place.

It is to be understood that the polyhydric alcohol or polybasic acid added to the reaction system may be either a single compound or a mixture of two or more compounds.

The amount of polyfunctional compound added to the reaction system at the beginning of the second-step reaction should be determined according to the parameter defined by the formula $$\frac{W_1}{W_1 + W_2} \times 100$$

wherein $W_1$ is the weight of the intermediate product and $W_2$ is the weight of the polyfunctional compound. Specifically, the polyfunctional compound should be used in such an amount as to provide a value of 20 or greater and preferably from 40 to 80 for the parameter. It is to be noted that, when the first-step reaction is carried out in the presence of a solvent, the weight of the solvent should be excluded from the weight ($W_1$) of the intermediate product. However, if the solvent is a polyhydric alcohol, its weight should be added to the weight ($W_2$) of the polyfunctional compound. When the second-step reaction is a maleinization reaction, maleic anhydride is preferably used in such an amount as to provide from 0.1 to 0.5 mole of maleic anhydride for each equivalent of the carbon-to-carbon double bonds remaining in the intermediate product.

The extent to which the second-step reaction has proceeded can generally be estimated by measuring the acid value of the reaction system. This makes it possible to control the molecular weight of the polymer or polymers contained in the coating resin compositions of the present invention. When the second-step reaction is a maleinization reaction, it is preferable to complete this reaction. In this case, the reaction system may be periodically analyzed for maleic anhydride by liquid chromatography. Then, the completion of the second-step reaction can be confirmed by the fact that no unreacted maleic anhydride is detected.

As described above, the second-step reaction may be either an esterification reaction, an ester interchange reaction, or a maleinization reaction, depending on the type of intermediate product resulting from the first-step reaction and the type of reactant newly added to the reaction system. In all cases, the second-step reaction is preferably carried out at a temperature of from 150° to 250° C. in an atmosphere of nitrogen. In the case of an esterification reaction, it is desirable to carry out the second-step reaction while distilling off the water formed. In the case of an ester interchange reaction, it is preferable to carry out the second-step reaction in the presence of an ester interchange catalyst such as lead oxide, lead acetate, zinc acetate, titanium alkoxides, or the like.

Prior to practical use for coating purposes, the coating resin compositions obtained by the above-described process of the invention may be rendered water-soluble by neutralizing the phenolic hydroxyl groups and carboxyl groups contained therein with a suitable base. Specific examples of such a base include, for example, ammonia; amines such as diethylamine, triethylamine, ethanolamine, diethanolamine, triethanolamine, dimethylethanolamine, diethylethanolamine, tri-isopropanolamine, and the like; and alkaline metal hydroxides such as lithium hydroxide, sodium hydroxide, potassium hydroxide, and the like.

In practical applications, the above-described coating resin compositions can be used in combination with formaldehyde condensation resins such as melamine-formaldehyde resin, urea-formaldehyde resin, phenol-formaldehyde resin, and the like, and modified resins derived therefrom. Moreover, they can be used in combination with a curing catalyst selected from organic metallic salts such as lithium naphthenate, zinc naphthenate, cobalt naphthenate, lead naphthenate, manganese naphthenate, and the like.

In the preparation of paints, the above-described coating resin compositions may suitably be blended with inorganic pigments, such as titanium oxide, iron oxide, zinc oxide, lead oxide, lead chromate, zinc chromate, lead molybdate, zinc molybdate, calcium carbonate, barium sulfate, silica, alumina, and the like, and various known organic pigments. Furthermore, they may be diluted with at least one solvent selected from water and organic solvents including hydrocarbons such as toluene, xylene, mixed naphtha, mineral spirits, and the like; alcohols such as methanol, ethanol, isopropanol, butanol, octanol, and the like; ketones such as methyl ethyl ketone, methyl isobutyl ketone, and the like; acetic acid esters such as ethyl acetate, butyl acetate, and the like; and glycol ethers such as methyl cellosolve, ethyl cellosolve, butyl cellosolve, and the like.

The paints prepared according to the above-described teachings, are particularly useful as undercoatings for metals such as iron and can be applied by any conventional techniques such as spraying, brushing, roll coating, and immersion coating. Moreover, when rendered water-soluble, they can also be applied by electrodeposition. After application, the paints may be dried either at room temperature or at elevated temperatures to evaporate the solvent, whereby a coating film having excellent resistance to corrosion and to water is formed.

The present invention is further illustrated by the following examples. In these examples, all percentages are by weight.

EXAMPLE 1

Five hundred g of dehydrated castor oil (having an iodine value of 142-143) was mixed with 200 g of a p-isopropenylphenol compound (comprising 3% of monomer 85% of dimer, 7% of trimer, and 5% of tetramer). This mixture was allowed to react at 120° C. in the presence of 1 g of 10% aqueous sulfuric acid solution, during which time the mixture was periodically analyzed for p-iropropenylphenol monomer and dimer by gas chromatography. After 2 hours, the completion of the reaction was confirmed by the disappearance of their peaks. Then, 42 g of maleic anhydride was added and the resulting mixture was heated, with stirring, at 180° C. in an atmosphere of nitrogen until no unreacted maleic anhydride was detected by liquid chromatography. After the mxiture was cooled to 100° C. and neutralized with 85 g of triethylamine, 80 g of butyl cellosolve and 313 g of water were added as solvents to obtain a solution of water-soluble resin composition having a concentration of 60%.

EXAMPLE 2

To 215 g of Hy-Diene (highly conjugated linolic acid having an iodine value of 170-178; commercially avilable from Soken Chemicals Co., Japan) and 108 g of a p-isopropenylphenol compound (the same as used in Example 1) was added 0.2 g of p-toluenesulfonic acid. This mixture was allowed to react at 100° C. for 1 hour. In this example, and also in the succeeding exmaples, the completion of the reaction was confirmed in the same manner as described in Example 1. Then 274 g of trimethylolpropane and 227 g of phthalic anhydride were added and the resulting mixture was heated, with stirring, at 200° C. for 6 hours in an atmosphere of nitrogen while the water formed was being removed. After the mixture was cooled to 100° C., 505 g of xylene was added as a solvent to obtain a solution of resin composition having a concentration of 60%.

EXAMPLE 3

To 500 g of Linseed Oil NC-101 (isomerized linseed oil having an iodine value of 140-170; commercially available from Nisshin Oil Manufacturing Co., Japan) and 200 g of a p-isopropenylphenol dimeric reactant (comprising 98% of the compound of formula (II) wherein n=0 and 2% of the compound of formula (III) wherein n=0) was added 0.2 g of p-toluenesulfonic acid. This mixture was allowed to react at 140° C. for 3 hours. Then, 126 g of phthalic anhydride, 59 g of neopentyl glycol, and 44 g of Epicoat 1001 (epoxy resin; commercially available from Shell Chemicals Co., Japan) were added and the resulting mixture was heated, with stirring, at 200° C. for 8 hours while the water formed was being removed. After the mixture was cooled to 100° C. and neutralized with 54 g of dimethylethanolamine, 110 g of butyl cellosolve and 444 g of water were added as solvents to obtain a solution of water-soluble resin composition having a concentration of 60%.

EXAMPLE 4

To 204 g of Polyoil #110 (polybutadiene having a number-average molecular weight of 1600, having an iodine value of about 450, and comprising 74% of the cis-1,4-addition, 25% of the trans-1,4-addition, and 1% of the 1,2-addition; commercially available from Nippon Zeon Co., Japan) and 102 g of a p-isopropenylphenol dimeric reactant (the same as used in Example 3) was added 0.3 g of p-toluenesulfonic acid. This mixture was allowed to react at 115° C. for 3 hours. Then, 24.5 g of maleic anhydride was added and the resulting mixture was heated, with stirring, at 210° C. until no unreacted maleic anhydride was detected. After the mixture was cooled to 100° C. and neutralized with 95 g of tri-isopropanolamine, 50 g of butyl cellosolve and 75 g of water were added as solvents to obtain a solution of water-soluble resin composition having a concentration of 60%.

EXAMPLE 5

To 215 g of Hy-Diene (the same as used in Example 2) and 108 g of a p-isopropenylphenol compound (the same as used in Example 1) was added 0.2 g of p-toluenesulfonic acid. This mixture was allowed to react at 100° C. for 1 hour. Then, 28 g of pentaerythritol was added and the resulting mixture was heated, with stirring, at 200° C. for 4 hours in an atmosphere of nitrogen while the water formed was being removed. After the mixture was cooled to 100° C., 225 g of xylene was added as a solvent to obtain a solution of resin composition having a concentration of 60%.

EXAMPLE 6

Five hundred g of dehydrated castor oil (the same as used in Example 1) was mixed with 200 g of a p-isopropenylphenol compound (comprising 2% of monomer, 80% of dimer, 6% of trimer, 5% of tetramer, and 7% of pentamer and higher oligomers formed of up to 20 molecules of p-isopropenylphenol). This mixture was allowed to react at 120° C. for 2 hours in the presence of 1 g of 10% aqueous sulfuric acid solution. Then, 300 g of Epicoat 1004 (epoxy resin formed by the reaction of bisphenol A with epichloro-hydrin; commercially available from Shell Chemicals Co., Japan) and 0.2 g of lead oxide as a catalyst for ester interchange reaction were added and the resulting mixture was heated, with stirring, at 200° C. for 4 hours in an atmosphere of nitrogen. After the mixture was cooled to 100° C., 670 g of xylene was added as a solvent to obtain a solution of resin composition having a concentration of 60%.

EXAMPLE 7

To 500 g of polybutadiene diglycol ($\alpha,\omega$-hydroxylated atactic polybutadiene having a number-average molecular weight of 1000) and 150 g of a p-isopropenylphenol dimeric reactant (the same as used in Example 3) was added 0.2 g of dodecylbenzenesulfonic acid. This mixture was heated, with stirring, at 140° C. for 3 hours. Then, 83 g of terephthalic acid was added and the resulting mxiture was heated, with stirring, at 200° C. for 5 hours in an atmosphere of nitrogen while the water formed was being removed. After the mixture was cooled to 100° C., 475 g of xylene was added as a solvent to obtain a solution of resin composition having a concentration of 60%.

EXAMPLE 8

To 500 g of polybutadiene diglycol (the same as used in Example 7) and 150 g of a p-isopropenylphenol compound (comprising 4% of monomer, 90% of the dimer of formula (II) wherein n=0, and 6% of the trimer of formula (II) wherein n=1) was added 0.2 g of dodecylbenzenesulfonic acid. This mixture was heated, with stirring, at 140° C. for 3 hours. The, 60 g of trimethylolethane and 166 g of isophthalic acid were added and the resulting mixture was heated, with stirring, at 200° C. for 6 hours in an atmosphere of nitrogen while the water formed was being removed. After the mixture was cooled to 100° C., 550 g of xylene was added as a solvent to obtain a solution of resin composition having a concentration of 60%.

EXAMPLE 9

To 320 g of Polyoil #110 (the same as used in Example 4) and 80 g of a p-isopropenylphenol compound (the same as used in Example 8) was added 0.2 g of p-toluenesulfonic acid. This mixture was heated, with stirring, at 140° C. for 4 hours. Then, 49 g of maleic anhydride was added and the resulting mixture was heated, with stirring, at 200° C. for 3 hours in an atmosphere of nitrogen. Further, 52 g of neopentyl glycol was added and the resulting mixture was heated, with stirring, at 180° C. for 4 hours while the water formed was being removed. After the mixture was cooled to 100° C., 330 g of xylene was added as a solvent to obtain a solution of resin composition having a concentration of 60%.

CONTROL 1

In a flask, 500 g of dehydrated castor oil (the same as used in Example 1) was mixed with 42 g of maleic anhydride. This mixture was heated, with stirring, at 180° C. in an atmosphere of nitrogen until no unreacted maleic anhydride was detected. After the mixture was cooled to 100° C. and neutralized with 85 g of triethylamine, 70 g of butyl cellosolve and 290 g of water were added as solvents to obtain a solution of water-soluble resin composition having a concentration of 60%.

CONTROL 2

In a flask, 215 g of Hy-Diene (the same as used in Example 2) was mixed with 274 g of trimethylolpropane and 227 g of phthalic anhydride. This mixture was heated, with stirring, at 200° C. for 6 hours in an atmosphere of nitrogen while the water formed was being removed. After the mixture was cooled to 100° C., 450 g of xylene was added as a solvent to obtain a solution of resin composition having a concentration of 60%.

Using a three-roll mill, the solutions of resin composition obtained in Examples 1–9 and Controls 1–2 were blended with the respective ingredients indicated in Table 1. The paints thus prepared were applied to zinc phosphate-treated steel panels and dried under the respective conditions indicated in Table 2. Each of the resulting test panels was tested to evaluate the physical properties of the coating film. The test results are summarized in Table 2.

In Table 1, the formulations are expressed in terms of parts by weight. The butylated or methylated melamine-formaldehyde resin is a condensation product of melamine with formaldehyde having its methylol groups etherified partially with butanol or methanol to render it oil-soluble.

In Table 2, the physical properties of the coating film on each test panel were evaluated according to the following test procedures.

(1) Salt Spray Test

The degree of corrosion resistance was determined by exposing the test panel continuously to salt water (a 5% sodium chloride solution at 50° C.) ejected through a spray nozzle and thus accelerating its corrosion. In a part of the test panel, a cut had been made by means of a cutter. The corrosion resistance of the test panel was evaluated separately with regard to the intact surface area and the cut-bearing surface area.

After 200 hours of exposure, the intact surface area was visually examined for the presence of rust and blisters.

The cut-bearing surface area was also tested after 200 hours of exposure. When a piece of adhesive tape was applied and pulled, the coating film peeled off along the cut. The width of the resulting peel was measured and indicated in Table 2. It is to be understood that smaller widths represent higher degrees of corrosion resistance.

(2) Warm-Water Immersion Test

The test panel was immersed in warm water at 30° C. After 500 hours of immersion, the integrity of the coating film was evaluated by visual observation. It is to be understood that coating films having poor water resistance would become blistered and, in extreme cases, might peel off.

Table 1

| | Example | | | | | | | | | Control | |
|---|---|---|---|---|---|---|---|---|---|---|---|
| | 1 | 2 | 3 | 4 | 5 | 6 | 7 | 8 | 9 | 1 | 2 |
| Solution of Resin Composition | 99 | 80 | 80 | 99 | 99 | 99 | 99 | 80 | 99 | 99 | 80 |
| Cobalt Naphthenate | 1 | — | — | 1 | 1 | 1 | 1 | — | 1 | 1 | — |
| Titanium Oxide | 60 | 60 | 60 | 60 | 60 | 60 | 60 | 20 | 60 | 60 | 60 |
| Xylene | — | 40 | — | — | 40 | 40 | 40 | 40 | 40 | — | 40 |
| Water | 40 | — | 40 | 40 | — | — | — | — | — | 40 | — |
| Butylated Melamine-Formaldehyde Resin[1] | — | 20 | — | — | — | — | — | 20 | — | — | 20 |
| Methylated Melamine-Formaldehyde Resin[2] | — | — | 20 | — | — | — | — | — | — | — | — |

Notes:
[1] Commercially available under the trade name "Yuban 20SE-60" from Mitsui-Toatsu Chemicals Inc., Japan.
[2] Commercially available under the trade name "Cymel 350" from Mitsui-Cyanamide Co., Japan.

Table 2

| | | Example | | | | | | | | | Control | |
|---|---|---|---|---|---|---|---|---|---|---|---|---|
| | | 1 | 2 | 3 | 4 | 5 | 6 | 7 | 8 | 9 | 1 | 2 |
| Film Thickness (μ) | | 25 | 25 | 25 | 25 | 30 | 30 | 30 | 30 | 30 | 25 | 25 |
| Drying Conditions | Temperature (°C.) | 120 | 140 | 140 | 120 | 120 | 120 | 120 | 140 | 120 | 120 | 140 |
| | Time (min.) | 20 | 20 | 20 | 20 | 20 | 20 | 20 | 30 | 20 | 20 | 20 |
| Salt Spray Test for Corrosion Resistance | Intact Surface Area | OK | OK | OK | OK | OK | OK | OK | OK | OK | Partially Blistered | Partially Blistered |
| | Width of Peel from Cut (mm) | 2 | 2 | 1 | 2 | 2 | 2 | 2 | 1 | 2 | 10 | 8 |
| Warm-water Immersion Test for Water Resistance | | OK | OK | OK | OK | OK | OK | OK | OK | OK | Wholly Blistered | Partially Blistered |

What is claimed is:

1. A coating resin composition comprising the reaction product obtained by reacting at least one isopropenylphenol compound selected from the group consisting of the compounds of the formulas

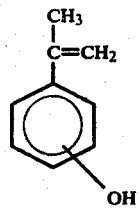

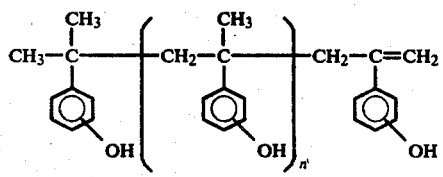

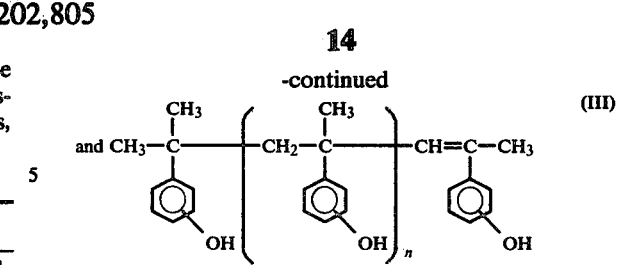

wherein n is a whole number of from to 18, with at least one unsaturated compound selected from the group consisting of straight-chain unsaturated fatty acids, unsaturated fats and oils composed mainly of glycerides of straight-chain unsaturated fatty acids, polymers of diene hydrocarbon, polymers of diene hydrocarbon having carboxyl substituents at the ends of the polymer molecule, polymers of diene hydrocarbons having hydroxyl substituents at the ends of the polymer molecule, and maleinized polymers of diene hydrocarbon; and then reacting the resulting intermediate product with at least one polyfunctional compound selected from the group consisting of polyhydric alcohols and organic polybasic acids.

2. The coating resin composition of claim 1 wherein the unsaturated compound is a straight-chain unsaturated fatty acid, a polymer of diene hydrocarbon having carboxyl substituents at the ends of the polymer chain, or a maleinized polymer of diene hydrocarbon, and the polyfunctional compound is a polyhydric alcohol.

3. The coating resin composition of claim 1 wherein the unsaturated compound is an unsaturated fat or oil composed mainly of glycerides of straight-chain unsaturated fatty acids, and the polyfunctional compound is a polyhydric alcohol.

4. The coating resin composition of claim 1 wherein the unsaturated compound is a polymer of diene hydrocarbon having hydroxyl substituents at the ends of the polymer molecule, and the polyfunctional compound is an organic polybasic acid.

5. The coating resin composition of claim 1 wherein the unsaturated compound is a straight-chain unsaturated fatty acid, an unsaturated fat or oil composed mainly of glycerides of straight-chain unsaturated fatty acids, a polymer of diene hydrocarbon, or a polymer of diene hydrocarbon having carboxyl substituents at the ends of the polymer molecule, and the polyfunctional compound is maleic anhydride.

6. The coating resin composition of claim 1 wherein the unsaturated compound is a straight-chain unsaturated fatty acid, a polymer of diene hydrocarbon having carboxyl substituents at the ends of the polymer molecule, a polymer of diene hydrocarbon having hydroxyl substituents at the ends of the polymer molecule, or a maleinized polymer of diene hydrocarbon, and the polyfunctional compound is a mixture of an organic polyhydric alcohol and a polybasic acid.

7. The coating resin composition of claim 1 wherein the unsaturated compound is an unsaturated fat or oil composed mainly of glycerides of straight-chain unsaturated fatty acids, and the polyfunctional compound is a mixture of a polyhydric alcohol and an organic polybasic acid.

8. A coating resin composition comprising the reaction product obtained by first reacting at least one isopropenylphenol compound selected from the group consisting of the compounds of the formulas

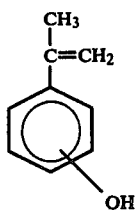

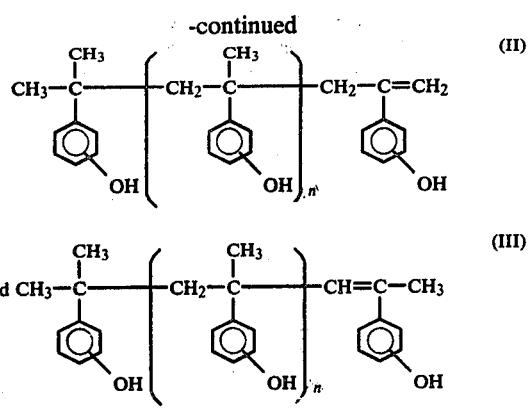

wherein n is a whole number of from 0 to 18, with at least one unsaturated compound selected from the group consisting of straight-chain unsaturated fatty acids, unsaturated fats and oils composed mainly of glycerides of straight-chain unsaturated fatty acids, polymers of diene hydrocarbon, and polymers of diene hydrocarbon having carboxyl substituents at the ends of the polymer molecule; secondly reacting the resulting first intermediate product with maleic anhydride; and then finally reacting the resulting second intermediate product with an organic polyhydric alcohol or a mixture of a polyhydric alcohol and a polybasic acid.

* * * * *